United States Patent [19]

Lundy

[11] Patent Number: 4,725,067
[45] Date of Patent: Feb. 16, 1988

[54] BICYCLE TRAILER

[76] Inventor: Thomas Lundy, 19A Charles Street, Guelph, Ontario, Canada, N1H 2E2

[21] Appl. No.: 783,625

[22] Filed: Oct. 3, 1985

[51] Int. Cl.$^4$ ............................................. B62K 27/00
[52] U.S. Cl. ...................... 280/204; 16/125; 280/292; 280/415 R; 280/460 R
[58] Field of Search ............... 280/204, 202, 200, 29, 280/292, 400, 415 R, 460 R, 47.24, 47.26, 414.1; 16/110 R, 114 R, 114 A, 125; 294/26, 170

[56] References Cited

U.S. PATENT DOCUMENTS

| | | | |
|---|---|---|---|
| 660,598 | 10/1900 | Stonebridge | 280/204 |
| 947,945 | 2/1910 | Sampson | 280/204 |
| 2,198,270 | 4/1940 | Maranville | 280/460 R |
| 2,283,716 | 5/1942 | Zalimeni | 280/204 |
| 2,507,793 | 5/1950 | Lenci et al. | 280/460 R |
| 3,498,662 | 3/1970 | Rey | 294/26 |
| 3,787,065 | 1/1974 | Grimm | 280/204 |
| 4,342,467 | 8/1982 | Kester | 280/204 |

FOREIGN PATENT DOCUMENTS

| | | | |
|---|---|---|---|
| 947725 | 1/1949 | France | 280/204 |
| 365161 | 1/1932 | United Kingdom | 280/204 |

*Primary Examiner*—John J. Love
*Assistant Examiner*—Mitchell J. Hill
*Attorney, Agent, or Firm*—Daryl W. Schnurr

[57] ABSTRACT

A two-wheeled bicycle trailer has a frame with a double tongue having two arms that extend on either side of a rear of a bicycle. The arms each have flat hands that are pivotally connected to said arms at a forward end thereof. A free end of said bands is pivotally connected on either side of said bicycle frame in the vicinity of a rear axle. As the trailer is towed and, particularly, as the bicycle turns, the bands automatically adjust for variations in the vertical height of the frame.

9 Claims, 7 Drawing Figures

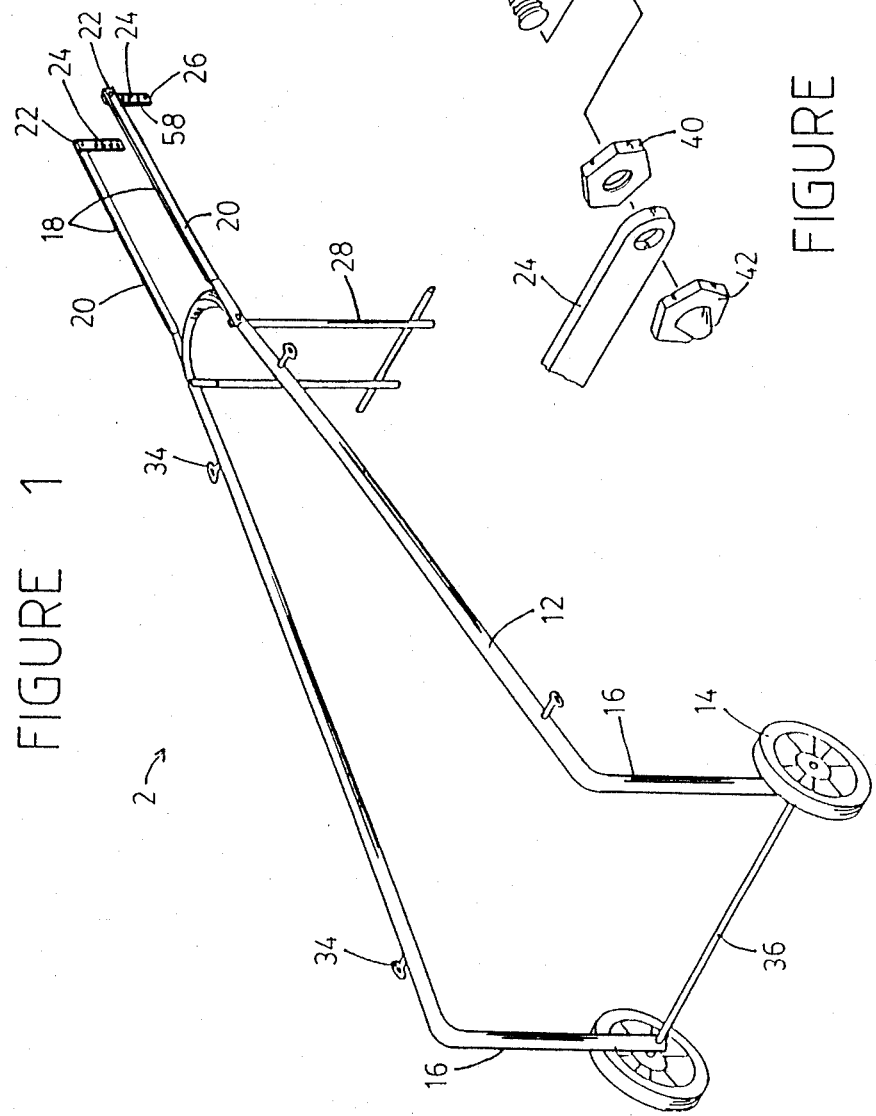
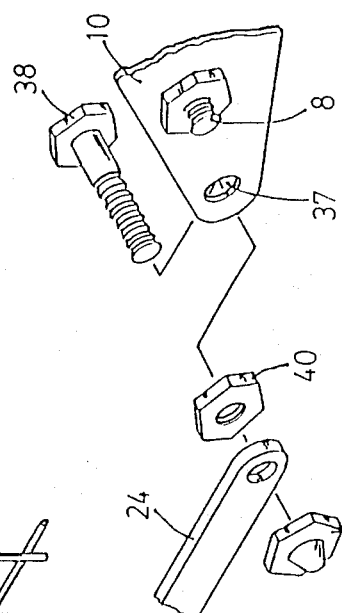
FIGURE 1
FIGURE 3

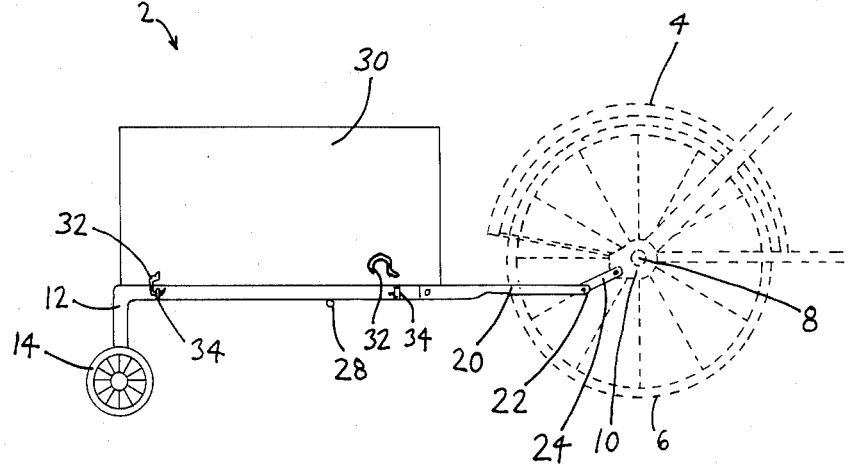
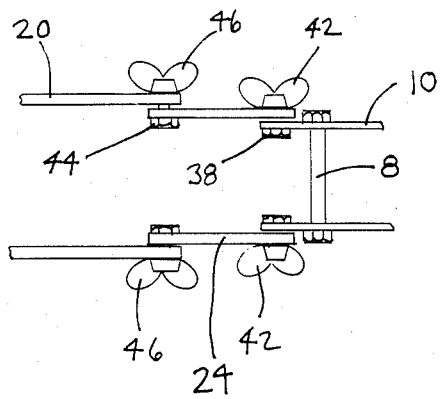
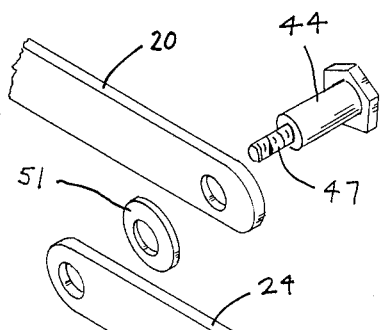
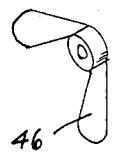
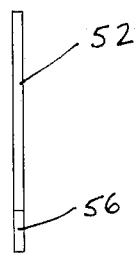
FIGURE 2
FIGURE 5
FIGURE 4
FIGURE 7
FIGURE 6

BICYCLE TRAILER

BACKGROUND OF THE INVENTION

1. Field of the Invention

This invention relates to a trailer for use with a bicycle and, in particular, to a two-wheeled trailer that can be removably affixed to a bicycle.

2. Description of the Prior Art

Trailers for bicycles are known. However, previous trailers have either been directly connected to a bicycle frame without being adjustable for the downward movement of one side of said frame and an upward movement of the other side of said frame while the bicycle is being driven; or, they have not been readily detachable from said frame without tools; or, they have been attached to said bicycle by flimsy, and therefore dangerous, connecting means; or, they have been complicated and expensive to manufacture. When a trailer cannot adjust vertically as a bicycle turns, there is a danger that the bicycle will not be able to turn freely when the trailer is fully loaded, or that the trailer will tip over during a turn, thereby causing the connecting means to sever or causing the bicycle to tip over as well.

SUMMARY OF THE INVENTION

It is an object of the present invention to provide a two-wheeled trailer for a bicycle, the connecting means for said trailer being adjustable to allow the bicycle to turn freely when the trailer is connected.

In accordance with the present invention, a trailer for use with a bicycle having a rear wheel, rear axle and bicycle frame has a frame with two wheels mounted on either side thereof and being located towards a rear portion of said frame. The trailer has a double tongue located at a front thereof. The tongue has two arms that extend on either side of the bicycle, one of said arms being affixed on either side of the bicycle frame in a vicinity of said rear axle. The arms each have a forward end with an elongated member horizontally pivoted thereon in a vertical plane when the trailer is in an upright position. Each elongated member has a free end that can be pivotally affixed horizontally to either side of a frame of said bicycle so that each arm has two horizontal pivot points which will enable the arms to automatically adjust to vertical variations in said bicycle frame as said bicycle is being driven while towing said trailer.

BRIEF DESCRIPTION OF THE DRAWINGS

In the drawings:

FIG. 1 is a perspective view of a trailer in accordance with the present invention with a kickstand in an open position;

FIG. 2 is a side view of said trailer connected to a rear portion of a bicycle, said trailer having a container mounted thereon;

FIG. 3 is an enlarged exploded perspective view of connecting means between said trailer and said bicycle;

FIG. 4 is an enlarged exploded perspective view of connecting means on a tongue of said trailer;

FIG. 5 is an enlarged top view of connecting means between said trailer and said bicycle;

FIG. 6 is a perspective view of a handle for manually towing said trailer; and

FIG. 7 is a side view of said handle.

DESCRIPTION OF A PREFERRED EMBODIMENT

Referring to FIGS. 1 and 2 in greater detail, there is shown a trailer 2 for use with a bicycle 4 (partially shown by dotted lines in FIG. 2), said bicycle having a rear wheel 6, a rear axle 8 and a frame 10. The trailer has a frame 12 with two wheels 14 mounted at either side 16 of said frame 12. The wheels 14 are located towards a rear portion of said frame 12. The trailer has a double tongue 18 with two arms 20 that extend on either side of said bicycle 4, one of said arms 20 being affixed on either side of the bicycle frame 10 in a vicinity of said rear axle 8.

The arms 20 have adjusting means thereon that will automatically adjust to vertical variations in said bicycle frame 10 as said bicycle 4 is being driven while towing said trailer. The arms 20 each have a forward end 22 with a relatively short elongated member or band 24 pivoted thereon in a vertical plane when the trailer 2 is in an upright position. Each elongated member 24 has a free end 26 that can be pivotally affixed to either side of a frame 10 of said bicycle 4.

The trailer 2 has a kickstand 28 which is shown in the open position in FIG. 1 and in the closed position in FIG. 2. A container 30 is mounted on the frame 12 of the trailer 2 shown in FIG. 2. The container 30 can have any convenient shape. Preferably, the container 30 is attached to the frame 2 so that it can be easily and simply removed without tools. As shown in FIG. 2, the container has hooks 32 at convenient locations and eyelets 34 are attached to the trailer frame 2. The hooks 32 can be removably engaged with the eyelets 34 to hold the container 30 rigidly on the frame 12.

The trailer 2 has a rear axle 36 that extends between the wheels 14 and provides strength to the trailer 2.

In FIG. 3, there is shown an expanded exploded partial perspective view of the connection of the trailer 2 to the frame 10 of the bicycle 4. The frame 10 has a suitable opening 37 into which can be inserted a threaded bolt 38. The bolt 38 is held onto the frame 10 by a nut 40. The elongated members 24 are flat bands that are inserted onto the bolt 38 and held in place on said bolts by nuts 42. The nuts 42 have a closed head so that they can be turned onto the bolts 38 by a fixed distance that allows the flat bands 24 to pivot on the bolts 38. While it may be beneficial to locate washers on the bolts 38 on either side of the flat bands 24, these washers have been omitted from the drawings for purposes of simplicity.

As shown in FIG. 4, each of the flat bands 24 is held onto each arm 20 by a bolt 44 which is held in place by a nut 46. The bolt 44 has a small threaded portion 47 so that the nut 46 can only be turned onto the threaded bolt 44 by a fixed distance to enable the flat band 24 to pivot on the bolt 44 relative to the arm 20. A washer 51 is located between the arm 20 and the band 24.

From FIG. 5, the general arrangement of the trailer-bicycle connection can be seen. This arrangement varies slightly from the connections shown in FIGS. 3 and 4, as wing nuts 42, 46 are turned onto bolts 38, 44 respectively, and the nut 40 and washer 51 have been omitted. The wing nuts 42, 46 are not turned tightly onto the bolts 38, 44 so that the bands 24 can pivot about the bolts 38 and 44 and the arm 20 can also pivot about the bolt 44.

It can readily be seen that the trailer 2 can easily be detached from the bicycle 4 by opening the wing nuts 42 and removing the flat bands 24 from the bolts 38. The wing nuts can then be stored on the bolts 38 until such time as it is desired to re-attach the trailer 2 to the bicycle 4.

As can best be seen from FIG. 1, the frame 12 of the trailer has a generally triangular shape with two sides 16 extending rearwards and outwards from said double tongue 18. Each side 16 of said frame extends downward at a rear of said trailer to support said wheels 14.

As shown in FIG. 6, a U-shaped handle 52 having sides 54 with hooks 56 thereon can be used to pull the trailer manually. When the trailer 2 is disconnected from the bicycle 4, the U-shaped handle 52 can be removably attached to the double tongue 18 by engaging the arms 20 with the hooks 56. The trailer can then be pulled manually to a desired location. As best shown in FIG. 1, the flat bands 24 have a series of openings 58 therein so that the bands 24 can be pivotally mounted to a frame of bicycles of different sizes using different openings to be inserted onto the bolts 38.

It has been found that when the trailer of the present invention is connected to a bicycle, the bicycle can be turned easily and safely within a small or large radius. The bicycle is just as easy to drive as a bicycle without a trailer. As the bicycle turns, that part of the bicycle frame on the inside of the turn is lowered and that part of the bicycle frame in the outside of the turn is raised. In other words, as the bicycle turns, the rear wheel of the bicycle slants towards the turn so that the axle of the wheel is no longer horizontal to a supporting surface. An end of the axle on the inside of the turn is lower or closer to the supporting surface than the other end of the axle which is raised or further from the supporting surface. This movement is automatically compensated for by the bands 24. Also, during a turn, that side of the bicycle on the outside of the turn moves forward at a greater rate than that side of the bicycle on the inside of a turn. This is automatically compensated for by the two wheels on the trailer as the outer wheel moves faster through a turn than the inner wheel.

What I claim as my invention is:

1. A trailer for use with a bicycle having a rear wheel, rear axle and bicycle frame, said trailer having a frame with two wheels mounted at either side thereof and being located towards a rear portion of said frame, said trailer having a double tongue located at a front thereof, said tongue having two arms that extend on either side of said bicycle one of said arms being affixed on either side of the frame of said bicycle in a vicinity of said rear axle, said arms each having a forward end with an elongated member horizontally pivoted thereon in a vertical plane when the trailer is in an upright position, each elongated member having a free end that can be pivotally affixed horizontally to either side of a frame of said bicycle so that each arm has two horizontal pivot points which will enable the arms to automatically adjust to vertical variations in said bicycle frame as said bicycle is being driven while towing said trailer.

2. A trailer as claimed in claim 1 wherein the elongated members are flat bands.

3. A trailer as claimed in any one of claims 1 or 2 wherein the frame has a generally triangular shape with two sides extending rearwards and outwards from said double tongue, each side of said frame extending downward at said rear of said trailer to support said wheels.

4. A trailer as claimed in any one of claims 1 or 2 wherein there is a kickstand that is pivotally mounted near a forward end of said frame so that said kickstand can be pivoted to an open position to support said trailer when the trailer is at rest and pivoted to a closed position when said trailer is being towed.

5. A trailer as claimed in any one of claims 1 or 2 wherein a container is mounted on said frame.

6. A trailer as claimed in any one of claims 1 or 2 wherein a U-shaped handle is provided, said handle having hooks at each end that can be removably attached to said double tongue for manually pulling said trailer.

7. A trailer as claimed in any one of claims 1 or 2 wherein the container is held on said frame by brackets that can be easily opened and closed.

8. A trailer as claimed in any one of claims 1 or 2 wherein the flat bands have a series of openings located therein so that said bands can be pivotally mounted to a frame of said bicycle using different openings for bicycles of different sizes.

9. A trailer as claimed in any one of claims 1 or 2 wherein the trailer is affixed to the bicycle frame using connecting means that can be manually connected and disconnected without tools.

* * * * *